April 25, 1967   A. H. LASSERS   3,316,453
CAPACITOR REPLACEMENT UNIT
Filed Oct. 23, 1965
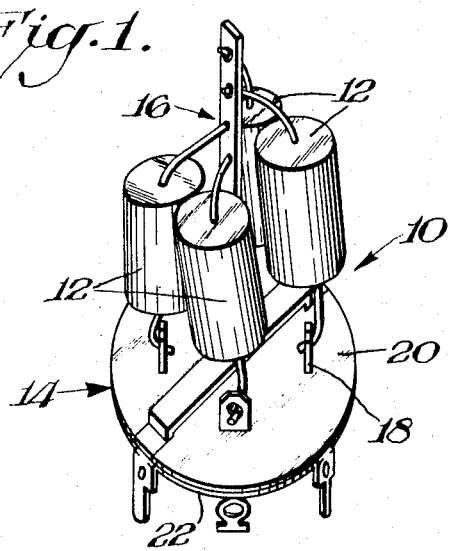
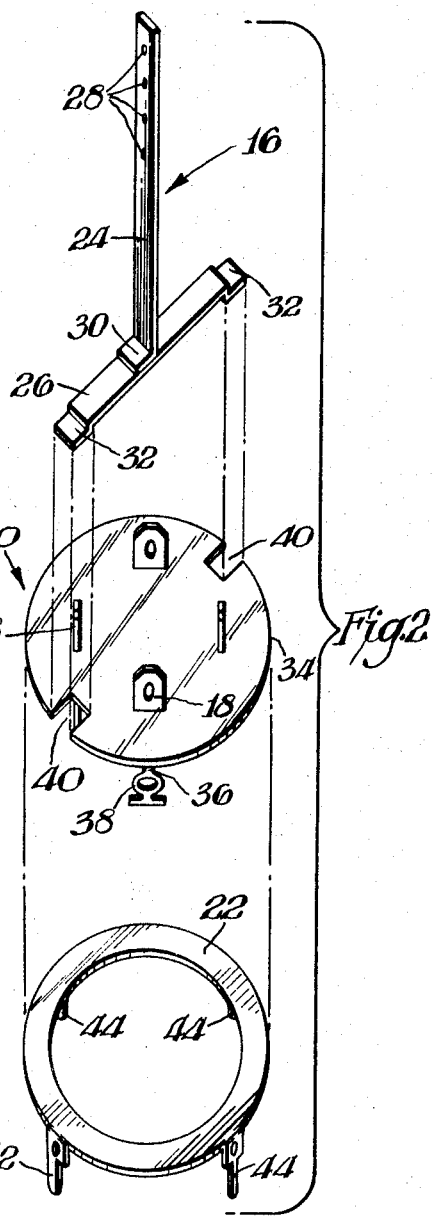
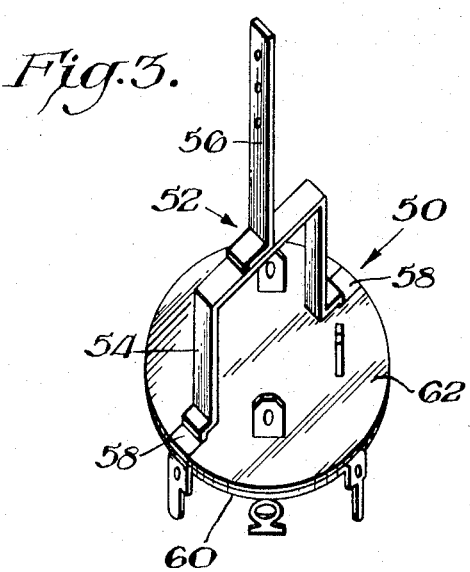

3,316,453
CAPACITOR REPLACEMENT UNIT
Arthur H. Lassers, Williamstown, Mass., assignor to Sprague Electric Company, North Adams, Mass., a corporation of Massachusetts
Filed Oct. 23, 1965, Ser. No. 503,800
5 Claims. (Cl. 317—99)

This invention relates to a capacitor replacement unit and more particularly to a mounting arrangement of a plurality of capacitors for multi-section capacitor replacement.

Multi-section capacitors, wherein a plurality of capacitance sections are rolled together, are used extensively in the electronics art due to the savings in cost and size afforded thereby. However, the failure of a single section usually renders the entire capacitor inoperative for its desired circuit function and requires replacement of the capacitor.

Direct replacement, however, is often impossible or severely delayed due to the lack of an exact replacement. One solution proposed by the prior art is the utilization of replaceable wedge-shaped capacitance sections which are bound together to constitute a generally cylindrical unit, similar to that of the present mutli-section devices. These, unfortunately, have not proven to be feasible because of the difficulties involved in providing uniform wedges having different capacitance value, and also because the odd-shaped sections serve to increase the number of different kinds of capacitance sections required to be produced by a manufacturer.

Individual capacitors may also be utilized to replace the multi-section device, however, circuit mounting and connection is often quite difficult due to a lack of both chassis area and convenient terminal points.

It is an object of this invention to provide a mounting device for multi-section capacitor replacement that is not subject to the deficiencies of the prior art.

It is another object of this invention to provide a mounting device for multi-section capacitor construction that utilizes conventional chassis mounting arrangements.

A further object of the invention is the provision of a mounting device combined with a plurality of individual tubular capacitors for replacement of a multi-section capacitor.

These and other objects of this invention will become apparent upon consideration of the following description and the accompanying drawing, wherein:

FIGURE 1 is a perspective of a multi-section capacitor replacement unit constructed in accordance with this invention;

FIGURE 2 is an exploded view in perspective of the mounting device illustrated in FIGURE 1; and FIGURE 3 is a perspective of further embodiment of the invention.

In general, the objects of this invention are attained by securing plurality of conventional tubular capacitors to a mounting device, adapted for replacement of a conventional multi-section capacitor, which employs mounting and terminal means extending from one end for upright enagement in a suitable chassis socket.

More specifically, the attainment of the objectives of this invention is accomplished by utilizing a mounting ring having a terminal support wafer overlying the mounting ring and secured to it by a substantially centrally disposed member to which each cathode lead of a plurality of individual capacitors is connected. The anode lead of each capacitor is connected to individual spaced apart terminals affixed to said wafer.

Referring now to the drawing and to FIGURES 1 and 2 thereof wherein is shown a replacement unit 10 having four capacitors 12 in combination with a mounting device 14. Conventional tubular capacitors 12 are employed in this arrangement to provide a replacement for a multi-section capacitor. Each capacitor 12 has, of course, a value equivalent to that of the section it replaces.

As illustrated, capacitors 12 are vertically arranged around a central member 16 with one lead of each capacitor, usually the cathode lead, connected to member 16, and the other to spaced apart terminals 18 of mounting device 14. In this way, any multi-section capacitor may be quickly and economically replaced by employing standard readily available tubular capacitors. It should be noted that the capacitor 12 need not be symmetrically arranged around member 16, as shown, but may be positioned to one side, when chassis space is not available on all sides of the replacement structure.

The mounting structure 14 consists of member 16, terminal support assembly 20 and mounting ring 22. Member 16 is secured in an upright position to ring 22 to provide mechanical support for the upright arrangement of capacitors 12, and a common terminal connection, through ring 22, to the chassis or ground.

Member 16 is constructed, in this embodiment, in the form of an inverted T having an upright mast or stem 24 and a transverse strap or yoke 26. Both are of any suitable metal such as steel or the like. For example, $\frac{1}{16}$ in. thick steel flat stock $\frac{1}{8}$ in. wide is satisfactory, however, is should be understood that suitable plating may be desirable for connection of the capacitor leads. Terminal means 28, such as holes or the like, are provided on mast 24 for convenience in connecting the capacitors 12. The position of the terminal means 28 along the upper portion of member 16 provides a vertical arrangement or cluster of capacitors 12 on the mounting device 14.

Stem 24 is affixed to strut 26 by welding, brazing or soldering, or the like, of a short transverse segment 30, as shown. However, other construction means may also be suitable. Thus, for example, member 16 could be made from a strip of flat stock which is folded and welded together along the length of stem 24 and extended in opposing directions to form strut 26. Rod stock may also be utilized in a similar manner, by twisting or welding it together to form stem 24 and strap 26.

Strut 26 carries at each end an offset portion or step 32 which allows strut 26 to overlay terminal plate assembly 20 and to be connected to ring 22, such as by welding or the like. Thus, in addition to supporting mast 24 and providing electrical connection from it to ring 22, yoke 26 also secures plate assembly 20 to the latter.

Advantageously, plate assembly 20 and mounting ring 22 provide a universal terminal and mounting arrangement substantially as described in U.S. Letters Patent 3,014,195 of H. V. May et al. Thus, assembly 20 consists of a disc 34 of rigid insulating material, such as phenolic or the like, having four spaced apart metal terminals 18 extended through and secured to disc 34.

Terminals 18 include a thin stem 36 and an enlarged end 38. This permits replacement of multi-section units in either chassis or printed circuits since the enlarged end 38 may be used for the tying of leads or may be cut off to allow insertion and connection in a circuit board. The terminals 18 may be affixed to plate 34 by any number of means. For example, the upper portion of terminals 18 may be bent or twisted to force plate 34 against an enlarged area of the terminal and thereby secure them.

Indentations 40, which are close fitting to strap 26 are provided at opposite edges of wafer 34 to secure it to mounting ring 22. Accordingly, wafer 34 is locked in place by strap 26, however, other means of securing the plate 34 may also be suitable. Thus, short upright clips or tabs, not shown, of ring 22 may be bent over the plate to affix it, or adhesive or the like may be employed.

The universal mounting arrangement is provided by a flat metal washer or mounting ring 22 having indexing lug 42 and three narrow lugs 44 extending downward therefrom. Lugs 44 are made narrow enough and disposed in positions about the circumference of ring 22 to permit them to fit a wide range of mounting slots.

Advantageously, various ring diameters and stud positions may be employed to accommodate the replacement of different multi-section units. Thus, as shown in FIGURE 3, a similar mounting device 50 may also be employed to replace the generally smaller diameter of a three section capacitor, however, a slightly modified central member 52 is required since the strap or yoke 54 must clear the more closely spaced terminals of the smaller unit.

Accordingly, in this modification, yoke 54 is a U-shaped body having a short attached upright mast 56. A double step 58 is provided at each end of yoke 54 to connect it to mounting ring 60 and to secure terminal plate 62 to the latter.

Thus, replacement of any multi-segment capacitor is readily accomplished by combining the required plurality of tubular capacitors with the described mounting device. In each case, the diameter of the defective multi-section capacitor will of course determine the approximate diameter of the replacement mounting ring and terminal plate, and the space available will determine the particular position of the capacitors around the upright member. Thus, although the overall diameter of the capacitor cluster may exceed that of the multi-section unit, the vertical cluster may be arranged according to the available space. In this way, even though the area is confined in one or more directions adjacent the chassis, the unit may be easily replaced by a slight non-symmetrical mounting of the cluster.

Furthermore, although the invention has been described in terms of a specific embodiment it should be understood that many different modifications may be made without departing from the spirit and scope thereof and that the invention is not to be limited except as defined in the appended claims.

What is claimed is:

1. A capacitor replacement mounting arrangement comprising a metal mounting ring having lugs extending therefrom, a terminal support assembly including an insulating wafer having a plurality of spaced terminals thereon, said support sassembly being joined to said mounting ring, a substantially centrally disposed upright stem affixed to a transverse strap, said transverse strap being secured at each end to said mounting ring, said upright stem extending substantially perpendicular to said transverse strap and said mounting ring, and said upright stem having terminal means thereon.

2. An arrangement as claimed in claim 1 wherein said terminal means is a plurality of holes in said stem.

3. An arrangement as claimed in claim 1 wherein said wafer is affixed to said ring by said strap.

4. An arrangement as claimed in claim 1 wherein a plurality of capacitors are disposed around said upright member portion, and each of said capacitors having one lead in connection to said terminal means and the other lead in connection to one of said spaced apart terminals.

5. An arrangement as claimed in claim 2 wherein a plurality of capacitors are disposed around said stem and each of said capacitors having a cathode lead in connection within one of said holes and an anode lead in connection to one of said spaced apart terminals.

References Cited by the Examiner
UNITED STATES PATENTS 2,637,763   5/1953   Palmer _____ 317—101
3,014,195   12/1961  May et al. _____ 339—131

ROBERT K. SCHAEFER, *Primary Examiner.*

M. GINSBURG, *Assistant Examiner.*